Oct. 24, 1939.                  C. W. KNOFF                    2,177,024
                           AUTOMATIC MOTOR STOP
                            Filed Nov. 17, 1937
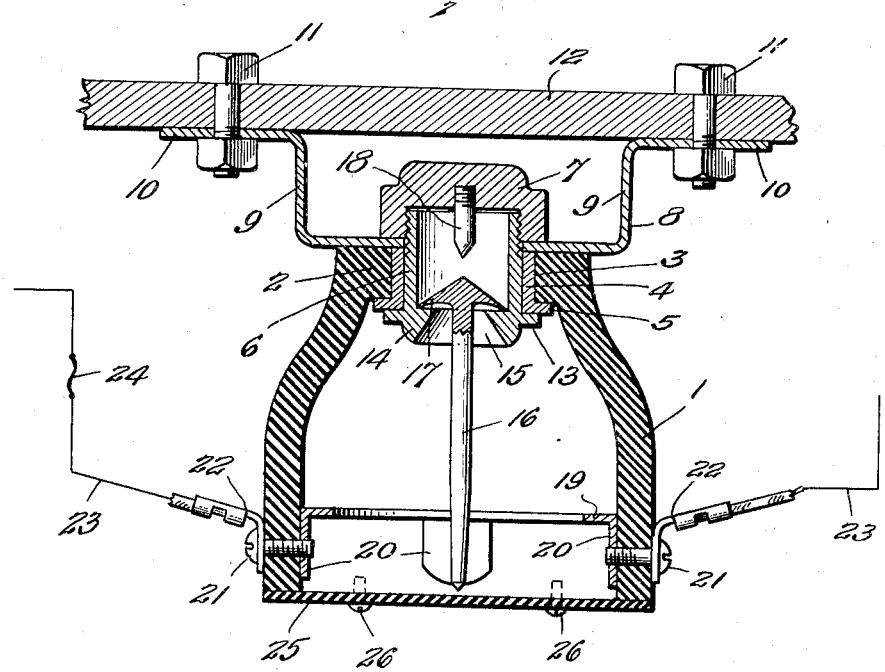
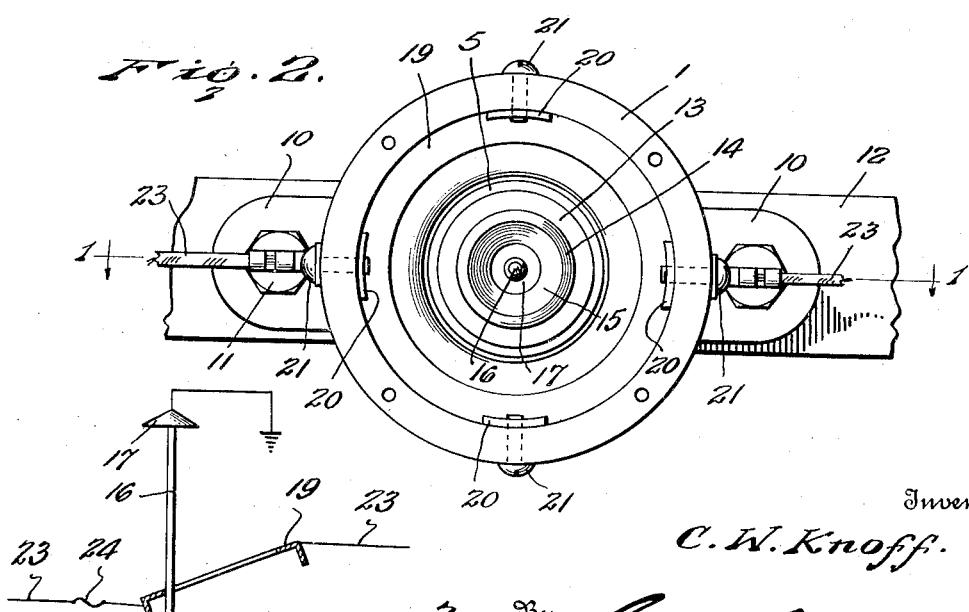

Patented Oct. 24, 1939

2,177,024

UNITED STATES PATENT OFFICE 2,177,024

AUTOMATIC MOTOR STOP

Curtis W. Kneff, Coshocton, Ohio

Application November 17, 1937, Serial No. 175,158

1 Claim. (Cl. 200—52)

This invention relates to an automatic motor stop. When an automobile is wrecked by colliding with another or running off a road or into a tree or post at a side of a road, it often happens that the automobile will be turned over and occupants thereof prevented from escaping due to injuries received or jamming of the doors. It also often happens that, when such an accident occurs and the engine is still running, a fire will be started by gasoline escaping from a broken feed pipe and the occupants of the automobile severely burned and sometimes burned to death before they can escape or be removed by rescuers.

Therefore, one object of the invention is to provide a device which will serve to automatically short circuit the battery and thus render the motor inoperative and eliminate danger of fire.

Another object of the invention is to so construct and mount the short-circuiting device that, when the automobile is in its normally upright position, a universally movable contact will remain suspended in an inoperative position but immediately moved into position to short circuit the battery when the automobile is turned over.

It is another object of the invention to provide the device with a depending contact movably mounted for universal tilting movement and a circular stationary contact surrounding the movable contact. It will thus be seen that no matter in which direction the automobile turns over the movable contact will move into engagement with the annular stationary contact and short circuit the battery.

Another object of the invention is to provide a device of this character which can be very easily assembled or taken apart when cleaning or repairs are necessary and in addition so construct the device that, when it is in use and mounted in a depending position upon a portion of the automobile to which the battery and the ignition system are grounded, the movable contact and the annular stationary contact will be enclosed in a housing of insulated material where they will be protected from exposure and prevented from being damaged by dust or dirt or stones and the like which may be thrown up from a road along which the automobile is traveling.

The invention is illustrated in the accompanying drawing, wherein

Figure 1 is a sectional view taken vertically through the short-circuiting device and showing it mounted in an operative position, Figure 2 is a bottom plan view of the device with the closure plate for the lower end of its housing removed, and Figure 3 is a diagram illustrating the manner in which a circuit will be short circuited when an automobile turns over.

This improved automatic motor stopping device which may be referred to as a short-circuiting device has a housing 1 which is formed of insulating material and of a cup-shaped formation. The housing or shell 1 has a head 2 at its upper end which is of reduced diameter due to upward taper of the walls of the shell and through this head is formed an opening 3 to receive a bushing 4 formed of conductive metal and having a circumferentially extending flange 5 at its lower end which engages the inner face of the head 2 about the opening 3 to limit upward movement of the bushing through the head. A sleeve 6 which is also formed of conductive metal is snugly received through the bushing 4 and is of such length that, when it is in place, its threaded upper end portion projects from the upper end of the shell or casing for engagement by the cap nut 7 after passage of the coupler sleeve through the mounting bracket 8. This bracket is of substantially U-shaped formation and extends diametrically of the casing with its arms 9 extending upwardly at opposite sides of the shell 1 and terminating in feet 10 through which bolts 11 are passed in order to secure the bracket to a metal support 12 constituting a portion of the automobile. It will be understood that the battery and the ignition circuit will be grounded to the body portion of the automobile of which the support 12 forms a part. A circumferentially extending flange 13 is formed about the inner or lower end portion of the coupler sleeve 6 to overlap the flanged inner or lower end of the bushing 4 and cause the sleeve and the bushing to be firmly secured when the cap nut 7 is screwed tightly into place. This lower end portion of the sleeve is also formed with a thick head 14 and through this head is formed an opening 15 which gradually increases in diameter towards its lower end and thus provides a downwardly flaring passage through which passes a stem 16 formed of conductive material and constituting a movable contact having a head 17 at its upper end. The head 17 is of a conical formation to permit tilting of the contact stem from the depending position shown in full lines in Figure 1 to a circuit-closing position indicated by dotted lines in this figure. It should also be noted that the cap nut 7 carries a centrally located depending pin 18 provided for engagement by the head 17 in order to limit movement of the head and the stem longitudinally in the sleeve and prevent movement of the contact stem out of engagement with a stationary contact ring 19 in case the automobile should turn entirely over and come to a stop while resting upon its top. The contact ring 19 is formed of conductive material and provided with attaching ears 20 through which securing screws 21 pass to firmly hold the contact ring in place within the lower portion of the shell or casing 1. The screws not only serve to firmly hold the contact ring in place but certain of them also constitute fasteners for engagement by the terminals 22 of the circuit wires 23. A fuse 24 has been shown in one of the wires 23, but it is to be understood that fuses may be provided in both of these wires or entirely omitted according to the position occupied by the circuit-shorting device relative to the wiring of the automobile when it is installed. A cap or removable closure 25 which is also formed of insulating material is secured in closing relation to the bottom of the shell or casing by screws 26 and prevents the mechanism within the shell from being exposed to dust and dirt or damaged by stones thrown up from a road.

When this automatic motor stopping device is in use, it is mounted in a depending position by passing the bolts 11 through the bar 12 forming part of the automobile frame to which the battery and the ignition circuit are grounded. The automobile is driven in the usual manner and as long as it remains in an upright position the ignition system will function in the usual manner as the contact ring 19 constitutes a bridging member between the two wires 23 and the contact stem 16 hangs in a vertical position out of engagement with the contact ring. In case the automobile collides with another automobile or strikes an obstruction along a road and turns over due to the force of the impact or from rolling down an embankment, the contact stem which is mounted for universal tilting movement swings from a vertical position to an inclined position and makes contact with the ring 19 while its headed end remains in engagement with the sleeve 6 and sometimes with both the sleeve 6 and the pin 18. This will cause a short circuit, as shown in the diagram of Figure 3, and operation of the motor will be stopped either by blowing of the fuse 24 or merely due to the short circuiting. The device may be mounted in the ignition line between the switch and the distributer and the reason that mention of use of two fuses has been made is that some cars are grounded on positive and some on negative. The device may also be mounted in the line between the spark coil and the distributer or in the battery line in which case current to all electrically energized appliances of the automobile will be cut off when the fuse is blown. In case repairs or replacements are necessary, the cap 7 is unscrewed from the sleeve to disconnect the device from the bracket 8 and when the cap or closure plate 25 is removed the device can then be entirely taken apart and the necessary cleaning or replacements made and the elements reassembled.

Having thus described the invention, what is claimed as new is:

A device of the character described comprising a bell-shaped casing of insulating material having a head at its top form with an opening, a bushing of conductive material fitting snugly within the opening and having an outstanding annular abutment flange about its lower end for engaging the inner face of the head about the opening and limiting upward movement of the bushing through the head, a sleeve passing through said bushing and having an outstanding annular flange about its lower portion overlapping the flanged end of the bushing, said sleeve projecting upwardly above the casing and having a threaded upper portion, a head for the lower end of said sleeve formed with an opening gradually increasing in diameter towards the lower end, a cap of conductive material threaded upon said sleeve and carrying a pin projecting into the sleeve, a mounting bracket of conductive material fitting about the sleeve between the cap and casing and firmly secured when the cap is tightened, a contact stem of conductive material extending through the opening in the head of the sleeve and formed with a head at its upper end disposed within the sleeve and resting upon the head of the sleeve and serving to suspend the stem in the casing and mount the stem for universal tilting movement, said pin serving as an abutment for engaging the head of the stem and limiting movement of the stem and its head longitudinally of the sleeve, and a contact ring mounted in said casing against walls thereof about said stem for engagement by the stem when the stem moves from a vertical position to an inclined position.

CURTIS W. KNOFF.